Figure 1:
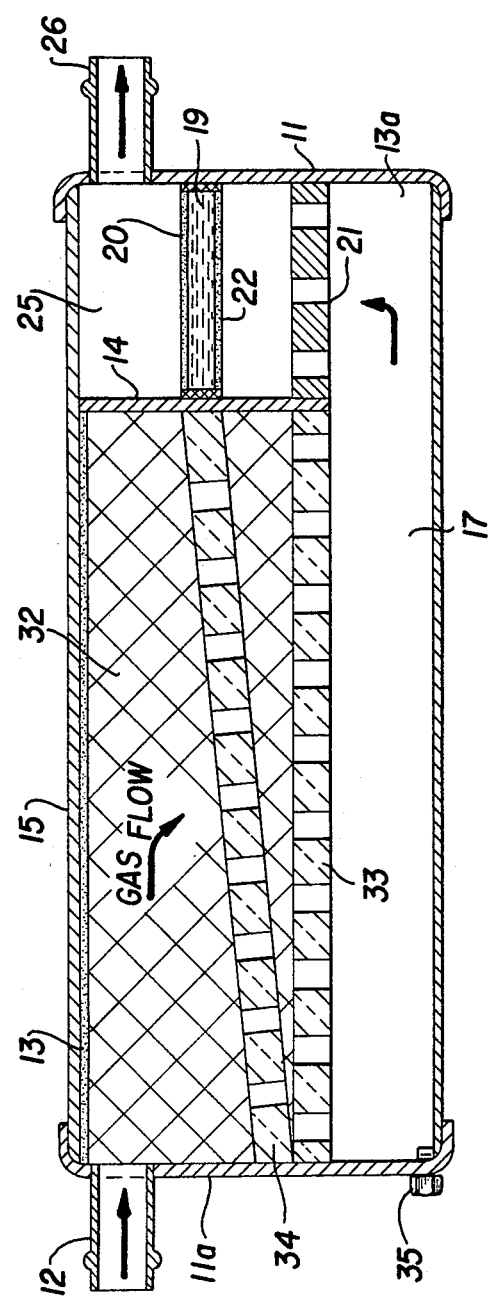

United States Patent [19]

Felker

[11] Patent Number: 4,466,816
[45] Date of Patent: Aug. 21, 1984

[54] CONDENSER FILTER INSERT FOR MUFFLERS FOR INTERNAL COMBUSTION ENGINES

[76] Inventor: George A. Felker, 873 Davis Ave., Pottsville, Pa. 17901

[21] Appl. No.: 439,222

[22] Filed: Nov. 4, 1982

[51] Int. Cl.³ .............................................. B01D 51/00
[52] U.S. Cl. ...................... 55/267; 55/319; 55/321; 55/DIG. 30; 422/177; 60/311
[58] Field of Search ............... 55/DIG. 30, 276, 267, 55/323, 324, 319–321, 322, 485, 526, 527; 422/177; 60/311

[56] References Cited

U.S. PATENT DOCUMENTS 1,747,882  2/1930  Prazmo ............................... 55/267
1,867,325  7/1932  Neville ............................... 422/177
3,556,735  1/1971  Epelman ............................. 55/276

*Primary Examiner*—Bernard Nozick
*Attorney, Agent, or Firm*—William Z. Warren

[57] ABSTRACT

This apparatus comprises a housing having a chamber lined with heat-resistant material in which exhaust gases, from an internal combustion engine, are re-burned. The apparatus also contains refractory screens to more efficiently break up the gases, before they enter a sump portion into which solid impurities fall from the said gas. Further filtering of the gases occurs as they pass through screens and a filter means before the said gases are released from the housing into the atmosphere.

4 Claims, 1 Drawing Figure

CONDENSER FILTER INSERT FOR MUFFLERS FOR INTERNAL COMBUSTION ENGINES This invention represents an improvement over the device disclosed in my U.S. Pat. No. 3,915,678, which issued on Oct. 28, 1975. The purpose of this Condenser Filter Insert is to eliminate or reduce the amount of carbon monoxide and hydrocarbons being given off into the atmosphere by internal combustion engines. This invention also saves on gasoline and causes an increase in power of the engine to which it is attached, in comparison with mufflers in current use.

BRIEF DESCRIPTION OF THE SOLE FIGURE

FIG. 1, the sole FIGURE, is a cross-sectional view, showing the internal construction of and the manner of the flow of gases through the preferred embodiment of this invention.

Other objects and advantages of my invention will become more apparent after a careful study of the following detailed description taken together with the accompanying drawing which illustrates a preferred embodiment of my invention.

Referring now more particularly to FIG. 1 which is a cross sectional view, wherein is illustrated the preferred embodiment of my invention, there is a hollow housing (11) having a chamber (13) through which the exhaust gases from the internal combustion engine will enter by means of the inlet projection (12) of housing (11). The exhaust gases will travel from the engine combustion chamber, into the inlet projection (12) and thereinto chamber (13). As may be apparent, this chamber (13) is an elongated one and is formed between baffle (14), which is secured fixedly to the wall (15) of housing (11), and the lateral housing adjacent thereto designated as (11a). The walls of the chamber (13) are lined with aluminum mesh and covered with a refractory or heat-resistant material (32). In the chamber (13), the hot exhaust gases from the engine will heat the said refractory material (32) and will be reburned. Then the exhaust gases are forced through the refractory screens (34) and (33), which will break up said gases so they will burn more freely. The gases being forced through the refractory screens (34) and (33) will have a blowing effect. The exhaust gases will then enter the sump area (17). As is evident, this sump area (17) is in communication with the lower portion of chamber (13). In this sump area (17), impurities, such as carbon, lead particles, dirt, etc., which are heavier than the exhaust gases, in which they are carried, will fall to the bottom of the sump area (17). Then the exhaust gases will continue across the sump area (17) and up through screens (21) and (22), the screens (21) and (22) being in abutment at their outer peripheries, with the inner periphery of housing (11) and baffle (14). After traveling through screen (22), the gases enter into a filter, comprising stainless steel or brass wool (20) within the chamber (19). In this said filter, further filtering of impurities, such as small particles of carbon, lead, dirt, etc., occurs and the said particles then fall into the sump area (17). The gases then enter the chamber (25) from where they pass through outlet (26) and are released into the atmosphere.

To clean out the device, one removes the cleanout plug (35) located at the bottom portion of the lateral housing (11a) on the end of the sump area (17) furthest from the outlet (26), revealing an opening in said lateral housing (11a). A compressed air hose is placed into the tail pipe which is, in normal operation, connected to the outlet (26). Air is then released from the compressed air hose, which air then flows through outlet (26) into chamber (25) and into the filter, chamber (19) with its stainless steel or brass wool (20), through screens (22) and (21), into sump area (17), across sump area (17) and out through the said cleanout opening formerly plugged by cleanout plug (35). Particles which have collected in the bottom of the sump area (17) or in any of the screens (21) or (22) or in the chamber (19) are the blown out of the device through said cleanout opening. The device thus may be cleaned without removing it from the vehicle.

It is to be understood that the invention is not limited to the illustration described and shown herein, which is deemed to be merely illustrative of the best modes of carrying out the invention, and which is susceptible to modification of form, materials, size, arrangement of parts and details of operation. The invention rather is intended to encompass all such modifications which are within its spirit and scope as defined by the claims.

What is claimed is:

1. A condenser filter device for an internal combustion engine for controlling exhaust emissions comprising:

a hollow body enclosed by a housing and by lateral end walls;

a baffle extending from the upper portion of said housing towards the lower portion of said housing, an elongated hollow chamber formed between said baffle and the first lateral end wall, said chamber having its walls lined with a heat-resistant material, an inlet in first lateral end wall for introducing into said elongated chamber a gaseous stream of exhaust emissions including particles resulting from combustion;

a first screen in said elongated chamber and supported between the baffle and the first lateral end wall, so that said gaseous stream and particles entering said elongated chamber must pass through said first screen;

a second screen at the lower end of said elongated chamber and supported between the baffle and the first lateral end wall, so that said gaseous stream and particles passing through said first screen must pass through said second screen;

a lower chamber in said body formed between the first and second lateral end walls and in communication with the lower end of said elongated chamber, said first lateral end wall having an opening, with a removable plug, at the lower end of said first lateral end wall, said lower chamber forming a sump into which the said particles may fall by gravity;

a third screen disposed above said lower chamber and oppositely of said elongated chamber and supported between the baffle and the second lateral end wall, so that said gaseous stream and remaining particles passing through said lower chamber must pass through said third screen;

a fourth screen disposed above said third screen and oppositely of said elongated chamber and supported between the baffle and the second lateral end wall, so that said gaseous stream and remaining particles passing through said third screen must pass through said fourth screen;

a filter disposed above said fourth screen and oppositely of said elongated chamber and supported between the baffle and the second lateral end wall, so that said gaseous stream and remaining particles passing through said fourth screen must pass through said filter;

said gaseous stream and particles flowing downwardly through the elongated chamber, the first screen, and the second screen, then laterally through the lower chamber, and then upwardly through the third screen, fourth screen, and said filter, the latter helping to remove any remaining particles from said stream and allowing said particles to fall by gravity into said sump;

and an outlet in said second lateral end wall above the said filter for allowing the now purified gaseous stream to be released from said body into the atmosphere.

2. Device of claim 1 wherein the said first and second screens comprise a heat-resistant material.

3. Device of claim 1 wherein the said filter comprises metal wool.

4. Device of claim 1 wherein the said first and second screens comprise a heat-resistant material and the said filter comprises metal wool.

* * * * *